July 29, 1941.  H. H. BABCOCK  2,250,454
TABLE TOP IRONING MACHINE
Filed Jan. 7, 1937  5 Sheets-Sheet 1
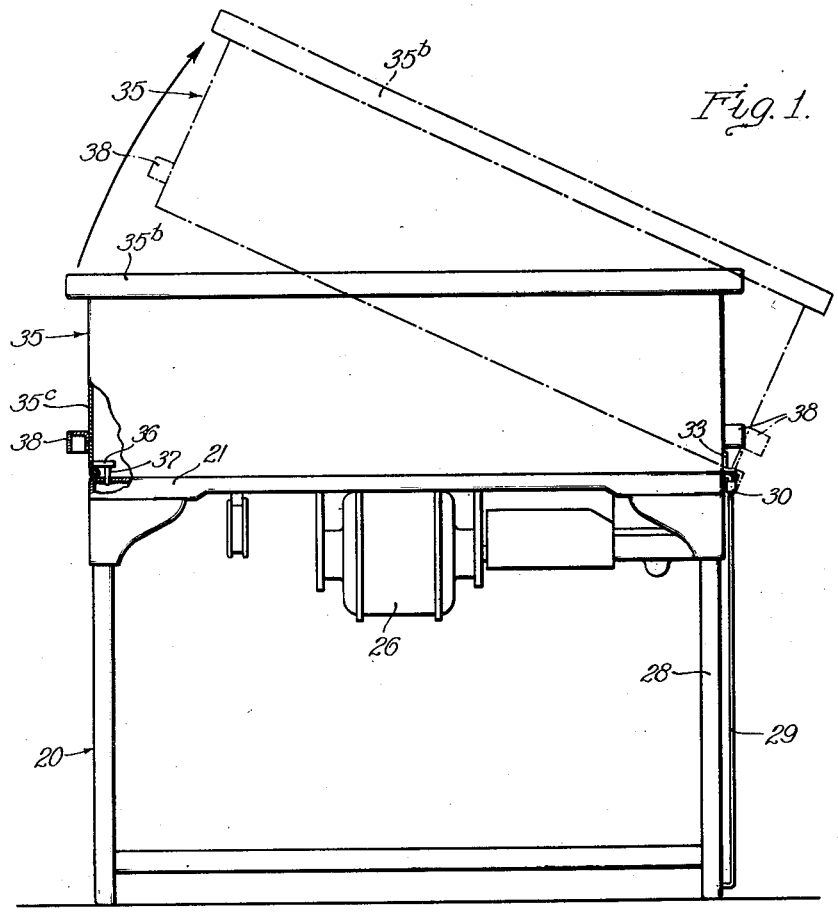
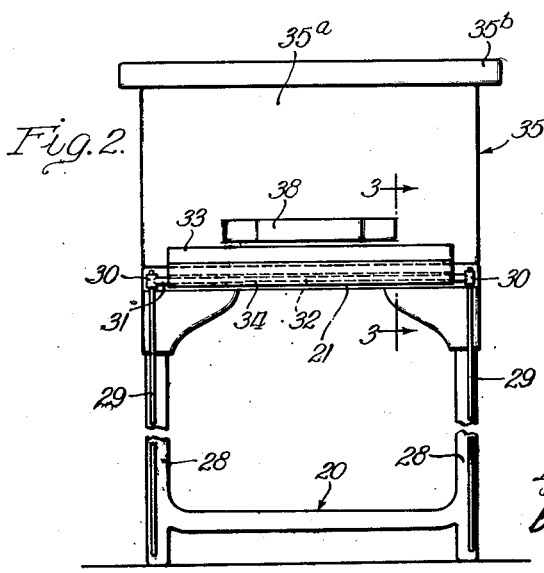
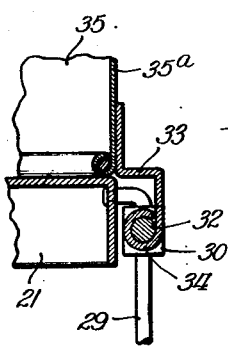
Inventor:
Henry H. Babcock
By:
Brown, Jackson, Boettcher & Dienner
Attys.

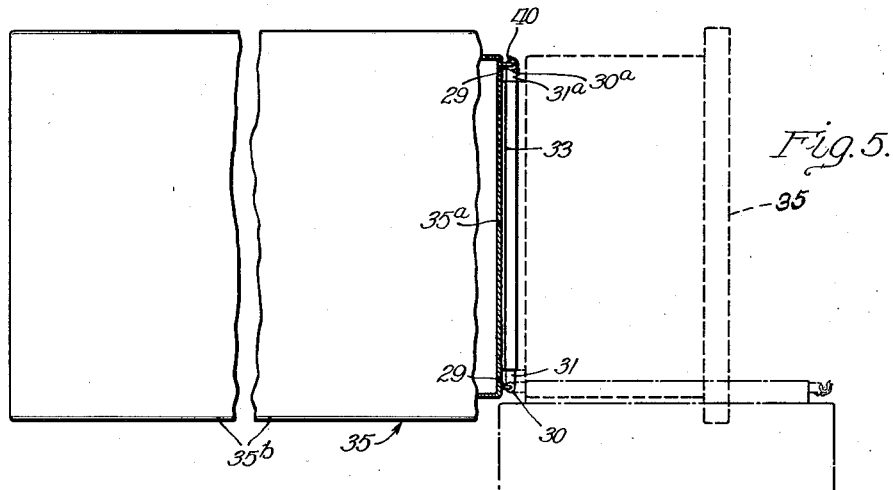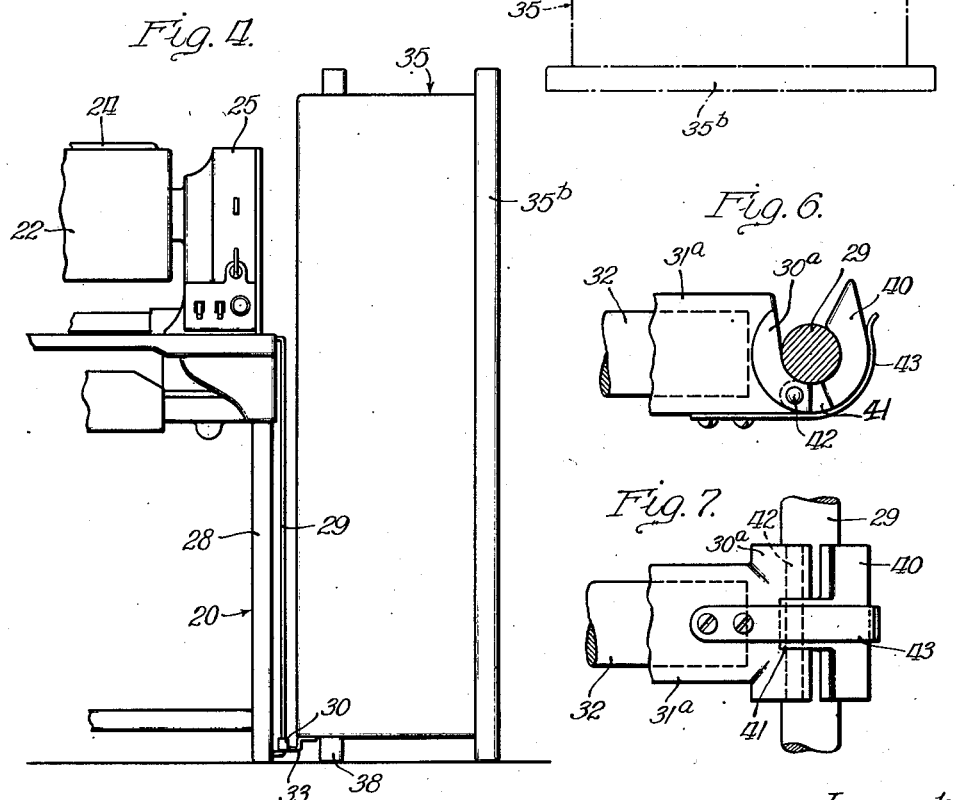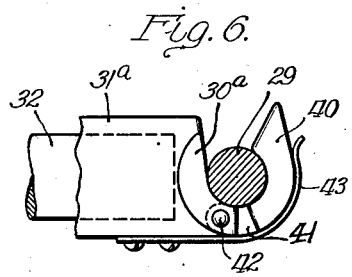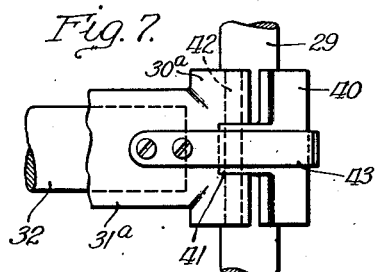

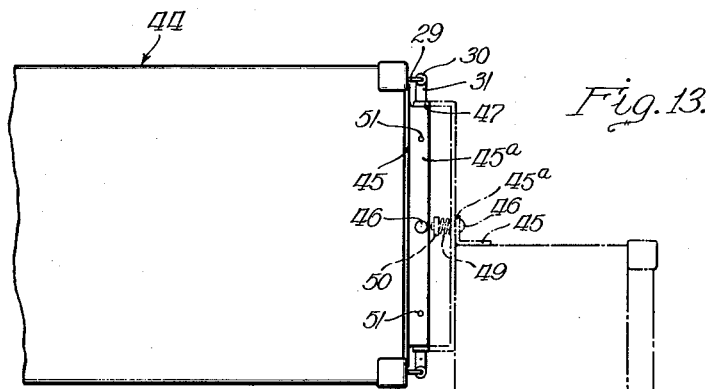
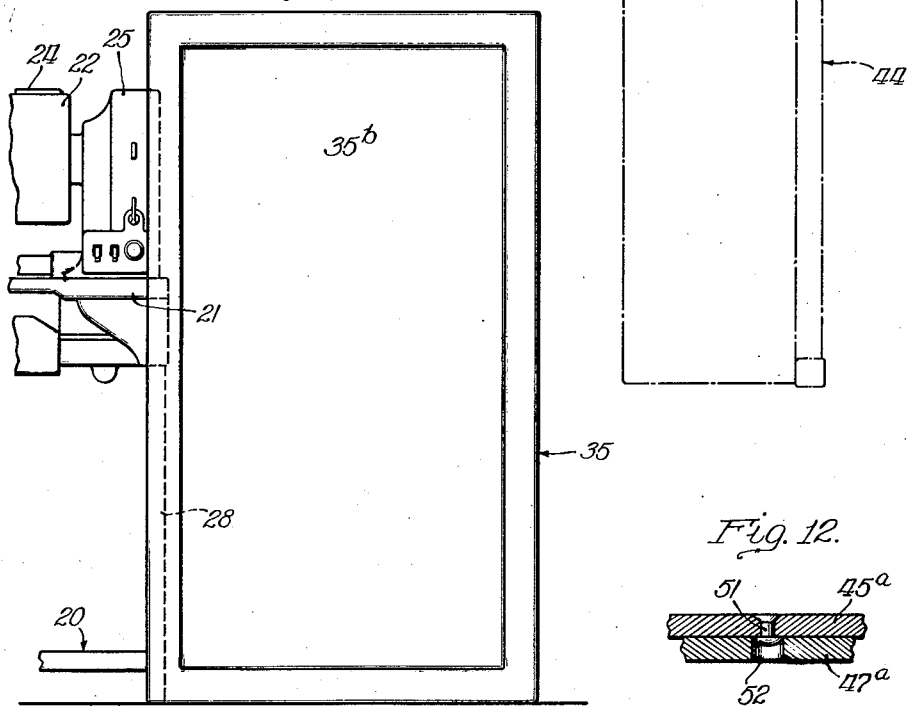
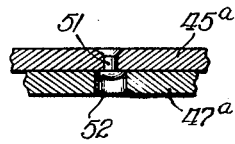

July 29, 1941.  H. H. BABCOCK  2,250,454
TABLE TOP IRONING MACHINE
Filed Jan. 7, 1937   5 Sheets-Sheet 4
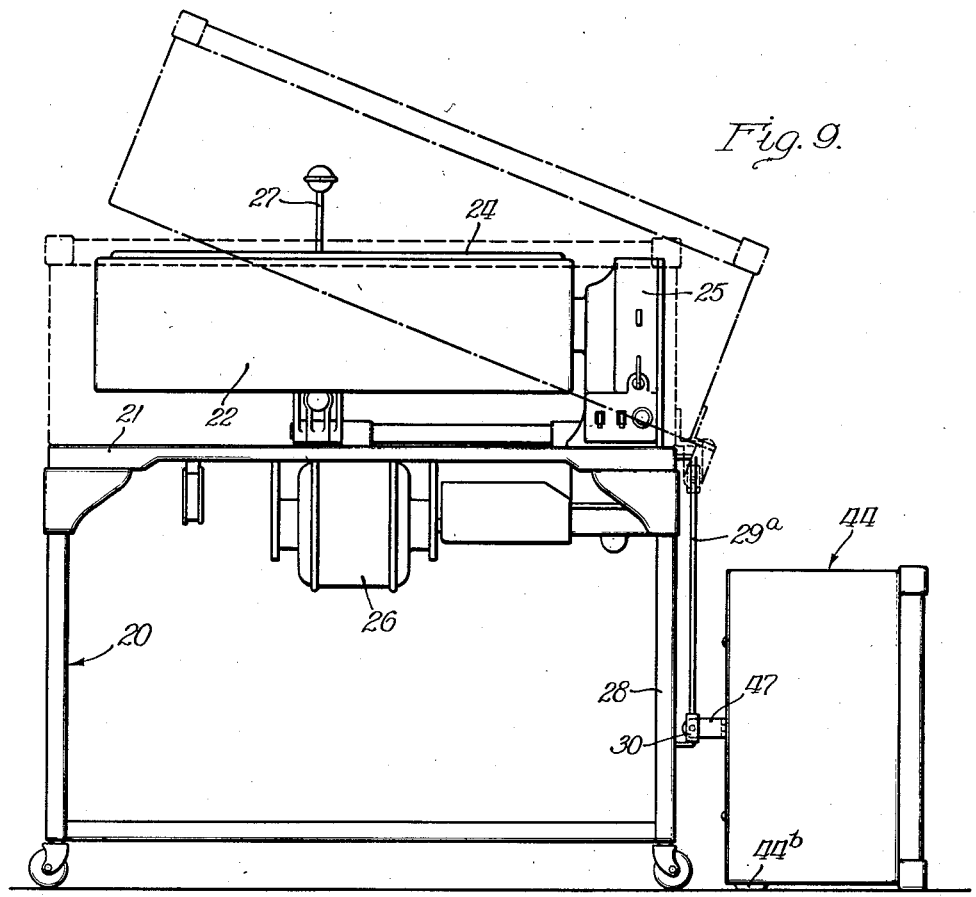
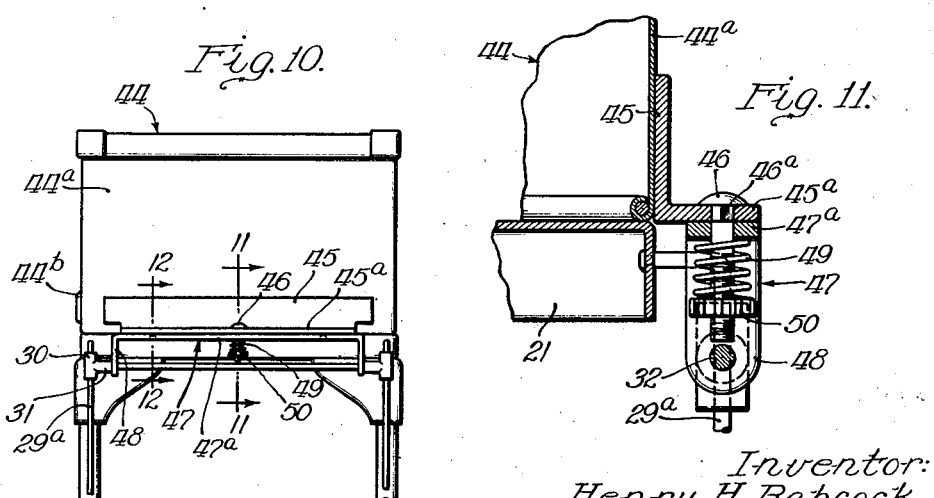
Inventor:
Henry H. Babcock July 29, 1941.    H. H. BABCOCK    2,250,454
TABLE TOP IRONING MACHINE
Filed Jan. 7, 1937    5 Sheets-Sheet 5
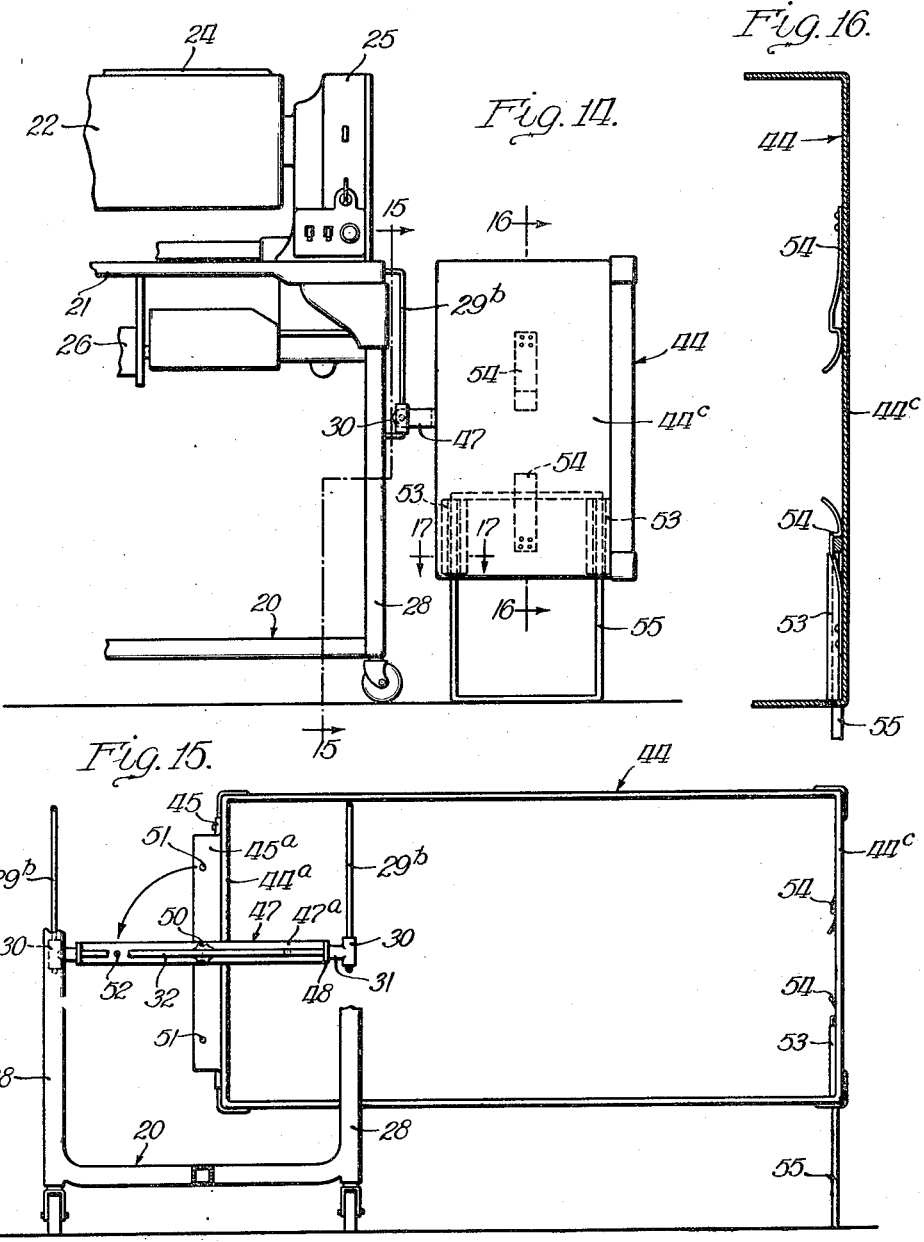
Inventor:
Henry H. Babcock
By: 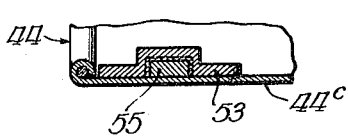
Attys Patented July 29, 1941

2,250,454

UNITED STATES PATENT OFFICE 2,250,454

TABLE TOP IRONING MACHINE

Henry H. Babcock, Oak Park, Ill., assignor to Conlon Corporation, Cicero, Ill., a corporation of Illinois Application January 7, 1937, Serial No. 119,430

2 Claims. (Cl. 45—68)

This invention relates to ironing machines, and has to do with the type of machines now known as table top ironing machines.

In Patent No. 1,656,656, issued January 17, 1928, to Carl F. Anderson and Rudolph W. Janda, for Ironing machines, there is disclosed an ironing machine having a box cover which, in closed position, houses the cooperating roll and shoe and, in open position, is disposed at the back of the machine with its open face exposed to the hot shoe, effective as a guard for the latter. This machine has proved to be highly efficient in use and my invention is in the nature of an improvement thereon.

Approximately ninety percent of persons owning ironing machines keep them in the kitchen. Many modern apartments have small kitchens in which floor space is quite restricted. In such an apartment disposition of the box cover of the ironing machine at the back of the machine, with the necessity of moving the machine away from a wall of the kitchen, may be objectionable as unduly obstructing the floor space. Under such conditions it is frequently desirable to permit the ironing machine to remain adjacent a wall of the kitchen, during the ironing operation, in which position the hot shoe, at the back of the roll, is effectively guarded by the wall. My invention is directed to the provision of a table top ironing machine the box cover of which may be moved into and out of operative position with expedition and facility while permitting the ironing machine to remain adjacent a wall of the room or kitchen during use thereof. A further object is the provision of a table top ironing machine in which the box cover is attached to the machine in such manner that it may be disposed, while so attached, at one end of the supporting structure of the machine so as to expose the ironing elements thereof while avoiding necessity of moving the machine outward away from a wall, adjacent which it normally is disposed, but avoiding objectionable obstruction of floor space. A further object is to provide means whereby the cover, when in open position, may be so disposed as to provide means for supporting articles, either to be ironed or ironed, or both, in position readily accessible to the operator of the machine. Further objects and advantages will appear from the detail description.

In the drawings:

Figure 1 is a front view, partly broken away and in section, of a table top iron machine embodying my invention;

Figure 2 is an end view, looking at the right hand end, of the machine of Figure 1;

Figure 3 is a fragmentary sectional view, on an enlarged scale, taken substantially on line 3—3 of Figure 2;

Figure 4 is a fragmentary front view of the machine of Figure 1 with the cover in full open position;

Figure 5 is a plan view, partly broken away and partly in section, of a modified form of machine embodying my invention, showing, in dotted lines, one open position of the cover, and, in dot and dash lines, a second open position of the cover;

Figure 6 is a detail plan view, on an enlarged scale, of the means for releasably attaching the rearward guide sleeve to the rearward guide rod, parts being broken away and parts being shown in section;

Figure 7 is an elevational view of the means shown in Figure 6;

Figure 8 is a fragmentary front view of the machine of Figure 5 with the cover in its second full open position;

Figure 9 is a front view of a second modified form of machine embodying my invention, showing the cover in full open position;

Figure 10 is a right-hand end view of the machine of Figure 9, with the cover in closed position;

Figure 11 is a fragmentary sectional view, on an enlarged scale, taken substantially on line 11—11 of Figure 10;

Figure 12 is a fragmentary sectional view, on an enlarged scale, taken substantially on line 12—12 of Figure 10;

Figure 13 is a fragmentary plan view of the machine of Figure 9, with the cover in closed position, the position of the cover when in full open horizontal position being indicated by the dot and dash lines;

Figure 14 is a fragmentary front view of a third modified form of ironing machine embodying my invention, showing the cover in full open position;

Figure 15 is a sectional view taken substantially on line 15—15 of Figure 14;

Figure 16 is a sectional view, on an enlarged scale, taken substantially on line 16—16 of Figure 14, partly broken away;

Figure 17 is a fragmentary sectional view, on an enlarged scale, taken substantially on line 17—17 of Figure 14, partly broken away.

The machine of my invention is, in general, similar in construction and operation to that of the above identified patent and, in certain respects, to the machine disclosed in Patent No. 2,026,345, issued December 31, 1935, to Rudolph W. Janda. It comprises a supporting structure including a frame 20 and a bed plate 21 supported thereby. An ironing roll 22 and a cooperating shoe 24 are mounted upon the supporting structure above the bed plate, there being a gear housing 25 at one end of the bed plate. The machine is driven by an electric motor 26 suitably supported beneath the bed plate and having appropriate driving and operating connections, through mechanisms within the housing 25, to the roll and the shoe. The shoe 24 is electrically heated, and suitable switches and control means are provided for appropriately controlling operation of the roll and the shoe, the latter being moved to and from the roll in a known manner and having associated therewith release means including a release lever 27, all as is well known in the art. The particular construction and operation of the machine is not of the essence of my invention and may be varied considerably. Suffice it to note that the machine includes a supporting structure, cooperating ironing elements mounted on the supporting structure, and means for operating said elements and controlling the operation thereof.

Conveniently, the frame 20 is provided, at each end thereof, with two vertical legs 28. Vertical guide rods 29 are suitably secured, at their lower ends, to legs 28 at one end of the machine, the upper ends of these rods being suitably secured to the adjacent end of bed plate 21. Sleeves 30 are slidably mounted upon rods 29, each sleeve being provided with an inwardly projecting tubular neck 31. A pintle rod 32 has its end portions suitably mounted in the necks 31 and is movable with sleeves 30 lengthwise of rods 29. A hinge plate 33, shaped as shown in Figures 2 and 3, is provided at its lower edge with a sleeve 34 which fits about rod 32, this plate being suitably secured, as by spot welding, to the end wall 35a of a box cover 35 which, in closed position, seats upon bed plate 21 and encloses the cooperating roll and shoe. Cover 35 is provided with an extended top 35b which, in the closed position of the cover, provides a table top. Preferably, cover 35 is provided, adjacent the other end wall 35c thereof, with suitably disposed interior brackets, one of which is shown at 36 in Figure 1, each of these brackets carrying a stud 37 engageable through a suitable opening in bed plate 21 and cooperating therewith for holding the cover against endwise displacement. Each end wall of the cover is preferably provided with an outwardly projecting handle 38 of channel cross-section, disposed at the mid-portion of the end wall and projecting outward therefrom the same distance as the top 35b.

In order to expose the ironing elements, for use of the machine, the cover is swung upward about the axis of pintle rod 32, into approximately the dot and dash line position indicated in Fig. 1, as indicated by the arrow, and may then be slid downward along the guide rods 29 in the continued movement of the cover about the axis of pintle rod 32. In this manner the cover may be disposed in vertical position with one end of top 35b thereof and the corresponding handle 38 resting upon the floor or supporting surface for the machine, the open face of the cover being disposed toward the adjacent end of the machine, as shown in Figure 4. This may be readily accomplished without any necessity for moving the machine away from a wall adjacent which it may be positioned. The floor space occupied by the cover is slight and the upper end of the cover, when disposed as in Figure 4, is available for supporting articles to be ironed, such articles being at the right of the operator of the machine and readily accessible. In this vertical open position of the cover the guide rods 29 and sleeves 30 and associated parts cooperate for effectively retaining the cover in such vertical position. In order to return the cover to closed position, the above described operation is reversed, the cover being slid upward along the rods 29 and lowered into position upon the bed plate 21.

In the modification shown in Figures 5 to 7, inclusive, I provide means whereby the rearward end of the pintle rod 32 may be detached from the rearward guide rod 29, thus permitting swinging of the cover, when the latter is disposed vertically, from the dotted line position of Figure 5 to the dot and dash line position of this figure. Sleeve 30a at the rearward end of pintle rod 32 is provided with an arcuate bill 40 shaped to engage about guide rod 29 and provided with a reduced shank 41 pivoted at 42 to sleeve 30a. A leaf spring 42, secured to tubular element 31a of sleeve 30a, fits about bill 40 and normally retains the latter in position for engagement about the guide rod 29. By pulling the sleeve 30a outward away from guide rod 29, bill 40 may be disengaged from this guide rod, permitting the cover to be swung into the dot and dash line position of Figure 5. By forcing sleeve 30a toward the associated guide rod 29 bill 40 may be reengaged about the guide rod, after which the cover may be moved lengthwise of the rods to closed position, in the manner previously described. This permits of the cover being moved into either open or closed position while also permitting of the cover being disposed in either the dotted line position, or the dot and dash line position, indicated in Figure 5. In the latter position of the cover the upper end thereof provides a support for articles to be ironed, and is so disposed that such articles are readily accessible to the operator. In the latter position of the cover, the open face thereof is directed rearward of the machine, as will be clear from Figures 5 and 8, and articles supported upon the upper end of the cover are more readily accessible than when the cover is in the dotted line position of Figure 5.

In the modified form of the machine shown in Figures 9 to 13, inclusive, the cover 44 is shaped somewhat differently than in the preceding forms. A bracket 45 of L-shape in cross section is suitably secured to end wall 44a of cover 44. Arm 45a of this bracket is provided, at the midlength thereof, with a squared opening which receives squared element 46a of a bolt 46 passing through arm 45a and through the bight portion of an elongated U-shaped bracket 47, arms 48 of which are mounted upon pintle rod 32 for pivotal movement about the axis thereof. A coil compression spring 49 is mounted about bolt 46 and is confined between bight element 47a of bracket 47 and a knob 50 screwing onto the nut. This provides a convenient means for adjusting the compression of spring 49. Arm 45a of bracket 45 is provided with two holding members in the form of rivets 51 having rounded heads which engage into openings 52 through bight element 47a of bracket 47, for maintaining the latter in parallelism with bracket 45.

Normally brackets 45 and 47 are parallel and the cover may be moved about the axis of pintle rod 32 and slid along guide rods 29a in the manner previously described. After the cover has been moved downward a proper distance, in the opening thereof, it may be turned about the axis of bolt 46, disengaging the members 51 from openings 52, so as to dispose bracket 45 perpendicular to bracket 47, with the side walls of the cover 44 in horizontal position and the cover extending forward of the machine. The guide rods 29a are of such length that, with the cover in this position, the lower side wall thereof, which is the wall of the cover disposed at the front of the machine when the cover is in closed position, rests upon the floor or supporting surface for the machine. It will be noted that the cover is provided, at each corner of its top, with slight projections and I preferably provide the forward side walls of the cover with bosses 44b equal in extent to the projections and cooperating therewith for supporting the cover when the latter is in full open position.

When the cover is in its full closed position, shown in dotted lines in Figure 9, it seats upon the bed plate and cooperates therewith for housing the ironing elements, in the manner previously described. In opening the cover it is swung upward about the axis of pintle rod 32, into approximately the dot and dash line position of Figure 9, and may then be moved downward along the guide rods 29a during its continued movement about the axis of the pintle rod. The cover is then turned about the bolt 46 so as to rest horizontally upon the floor or supporting surface for the machine, as shown in full lines in Figure 9, in which position it projects a considerable distance forwardly of the machine, as will be clear from Figure 13, in which the full open position of the cover is indicated by dot and dash lines. In this position the upper side wall of the cover provides a support of considerable extent for articles, either ironed or to be ironed, such articles being readily accessible to the operator seated in front of the machine.

In the modified form shown in Figures 14 to 17, inclusive, I provide means whereby the cover, when in the full open position with its side walls horizontal, may be supported an appreciable distance above the supporting surface or floor so that the lower and the upper side wall of the cover are both available for supporting articles. The cover and the mounting therefor are similar to the construction disclosed in Figures 9 to 13, inclusive, except that the guide rods 29b are shorter than guide rods 29a of Figure 9, and means is provided for supporting the end of the cover remote from the guide rods. A rectangular frame 55 is slidable through the lower side wall of the cover, in the open position of the latter, at the forward end wall 44c thereof. Flanged channel guide members 53 are suitably secured, as by spot welding, to the inner face of wall 44c and slidably receive the side arms of frame 55, the channels of member 53 registering with openings through the lower side wall of the cover, this wall being disposed at the front of the machine in the closed position of the cover. Suitably shaped spring clips 54 are secured upon the inner face of wall 44c end are oppositely related. The lower clip 54 receives the top bar of frame 55 in the projected position of the latter, and releasably holds this frame in such position, with the bottom bar thereof resting upon the supporting surface or floor upon which the machine rests. The guide rods 29b are of such length that the rearward end of cover 44, in the full open position thereof, is supported at the same height as the forward end thereof is supported by the frame 55, the cover being thus supported with its side walls in horizontal position and the lower side wall spaced a considerable distance above the floor. In this position of the cover the open face thereof is disposed toward the adjacent end of the machine and the upper and the lower side walls are available for supporting articles, either ironed or to be ironed, in such position as to be readily accessible to an operator seated at the machine. This is advantageous as rendering available, for supporting the articles, surfaces of much greater area than is available in any of the preceding forms of my invention.

While I have shown the guide rods 29a, of the form illustrated in Figures 9 to 13, inclusive, as shorter than the guide rods 29 of Figures 1 to 8, inclusive, this is not essential and these guide rods 29a of Figures 9 to 13, inclusive, may be of the same length as in the preceding forms. Also, if desired, in the form shown in Figures 14 to 17, inclusive, the guide rods 29b may be of the same length as the form shown in Figures 1 to 8, inclusive, suitable means, of known type, being provided for limiting downward movement of the guide sleeves along the guide rods. Obviously, the cover for the machine may be mounted at either end thereof, though ordinarily I prefer to mount it at the right-hand end of the machine, as illustrated and described.

As above indicated, and as will be understood by those skilled in the art, changes in construction and arrangement of parts of my invention may be resorted to, without departing from the field and scope of the same, and I intend to include all such variations, as fall within the scope of the appended claims, in this application in which the preferred forms only of my invention have been disclosed.

I claim:

1. In a structure of the character described, a stand and a cover therefor, substantially vertical guide rods connected to an end of said stand and spaced apart transversely thereof, a member connected to and slidable along said rods, a second member mounted on said first member for pivotal movement about the latter, and means pivotally connecting said cover to said second member for movement therewith and for movement relative thereto about an axis perpendicular to the pivot axis of said second member.

2. In a structure of the character described, a stand and a box-like cover therefor, two substantially vertical guide rods connected to an end of said stand and spaced apart transversely thereof, a member extending between said rods, means slidably and detachably connecting one end of said member to one of said rods, means slidably and pivotally connecting the other end of said member to the other of said rods, and means hingedly connecting said cover at one end thereof to said member for movement therewith and about an axis extending between said rods.

HENRY H. BABCOCK.